July 27, 1948.   C. M. HATHAWAY ET AL   2,445,880
ELECTRICAL STRAIN MEASURING APPARATUS
Original Filed Nov. 8, 1943
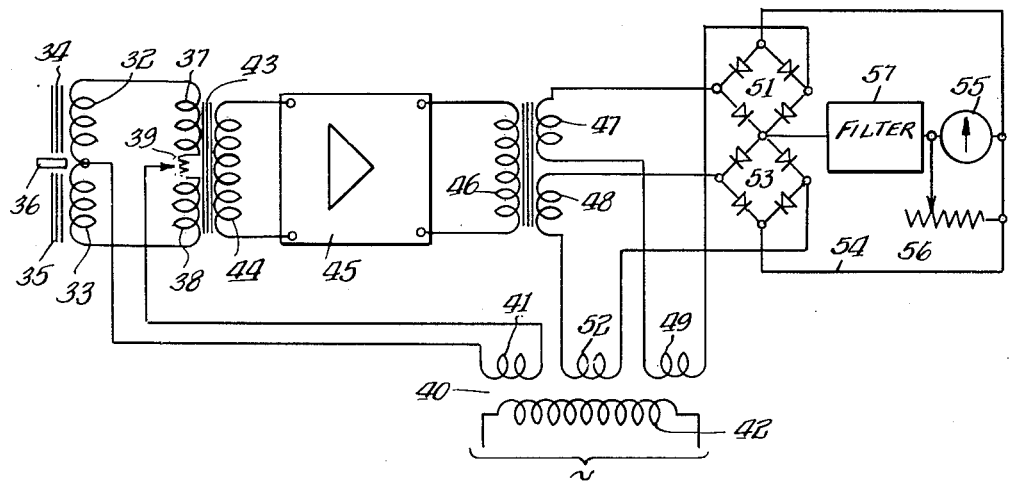
INVENTOR.
Claude M. Hathaway
BY
Moore, Olsen & Trexler
attys.

Patented July 27, 1948

2,445,880

UNITED STATES PATENT OFFICE 2,445,880

ELECTRICAL STRAIN MEASURING APPARATUS

Claude M. Hathaway, Denver, Colo., assignor to Hathaway Instrument Company, a corporation of Colorado Original application November 8, 1943, Serial No. 509,437. Divided and this application May 10, 1945, Serial No. 592,944

6 Claims. (Cl. 177—351)

My invention relates to electric measuring apparatus and, more particularly, to apparatus for measuring the stress or strain in a body. This is a division of my application Serial Number 509,437, filed November 8, 1943, for Electrical gaging apparatus, now Patent No. 2,421,420.

In measuring apparatus, particularly of the type which is to indicate compression or tension on the surface of a body under test, it is desired to obtain a sensitive accurate indication which will be indicative of whether the surface is being subjected to compression or tension strain. In a similar measuring apparatus commonly known as a comparator gage it also is desired to know as to whether a body is over or under a predetermined standard. In such instrument it also is desirable to obtain sensitivity and an indication as to how much a body varies over or under the standard set.

In accordance with the present invention, strain gages or comparator gages of the type utilizing a pair of variable impedances arranged to vary oppositely in accordance with a variable factor to be indicated, are connected to energize a circuit utilizing a pair of bridge rectifiers. In order that maximum sensitivity may be obtained the bridge rectifiers are arranged to be energized by circulating currents so that when the comparator gage or the strain gage is actuated the bridge rectifiers will be operating at their maximum sensitivity. Furthermore, in accordance with the present invention, a circuit arrangement is provided whereby the variable impedances comprising the gage unit are connected in a circuit which is readily balanced to a zero condition, independent of line voltage or alternating current voltage variations.

It therefore is an object of my invention to provide an improved displacement measuring apparatus which has a high degree of sensitivity.

Another object of my invention is to provide an improved displacement measuring apparatus wherein the zero position of the instrument is readily adjusted and where such position is independent of voltage variations.

Still another object of my invention is to provide an indicating apparatus or circuit energized from differentially connected bridge rectifiers operating at their maximum sensitivity.

My invention is set forth with particularity in the appended claims. Its construction and method of operation will subsequently become apparent together with further objects and advantages thereof, by reference to the following description taken in connection with the accompanying drawing wherein the figure is a schematic circuit representation of an arrangement embodying the present invention.

In the drawing there is shown a pair of variable inductances 32 and 33, each provided with a magnetic core 34 and 35 arranged to be influenced by a movable armature 36. Such an arrangement, for example, might be one used in a comparator gage. The variable impedance 32 and 33 are connected in a series circuit including a pair of inductors 37 and 38 connected to a voltage divider 39. The adjustable contact on the voltage divider 39 is connected to a transformer winding 41 which is also connected to the common juncture between the variable impedances 32 and 33. The transformer winding 41 is one of a plurality of secondary windings which are energized from the primary winding 42 which is connected to a suitable source of alternating current of a frequency of several thousand cycles.

The pair of inductors 37 and 38 are mounted on a magnetic core 43 which is provided with a secondary winding 44 connected to a suitable amplifier 45. The output of the amplifier 45 is connected to the primary winding 46 of a transformer having two equal secondary windings 47 and 48. The one transformer secondary winding 47 is connected in series with a secondary winding 49 energized from the transformer primary winding 42. The two transformer windings 47 and 49 are connected in series across one diagonal of a bridge rectifier 51. The other transformer winding 48 is connected in series with a transformer secondary winding 52 also energized from the primary winding 42, and these two windings are connected across one diagonal of a bridge rectifier 53. The remaining diagonals of the bridge rectifiers 51 and 53 are connected together at one terminal and connected at their opposite terminals by a conductor 54. Connected between the common juncture of the two bridge rectifiers and the conductor 54 is an indicating instrument 55 which may be shunted by an adjustable resistor 56 to control the sensitivity thereof, and these elements are connected in series with a suitable filter 57. The filter 57 is provided to remove any components of the alternating current which still may be present in the direct current outputs of the bridge rectifiers 51 and 53.

The circuit shown provides alternating current energization of the variable impedances 32 and 33 which are arranged to be responsive to a variable factor by the actuation of the armature 36. The zero adjustment of the circuit including these variable impedances is provided by the voltage divider 39. Thereafter any operation of the position of the armature 36 will produce a variation of the impedances of the coils 32 and 33 so as to produce an alternating current voltage in the secondary transformer winding 44 which has a phase relation dependent upon the direction of the movement of the armature 36. This alternating current is amplified by the amplifier 45 and supplied to the transformer windings 47 and 48 which each receive equal amounts of alternating current from the transformer 46 which is energized from the primary winding 42. The phase of the current supplied by the transformer winding 46 is such as to aid the currents in one secondary winding and to oppose the currents in the other secondary winding, thereby to vary the alternating current potential impressed across the bridge rectifiers 51 and 53. By supplying alternating current to the bridge rectifiers from the secondary windings 49 and 52 each of the bridge rectifiers is continually energized so as to be responsive to slight changes in voltage variations which are introduced in the coils 47 and 48. The bridge rectifiers therefore operate at their greatest sensitivity.

The armature 36 may be moved in response to a strain or stress, or may be moved in a comparator gage so as to indicate the deviation from the predetermined standard. Due to the differential indicating circuit provided for the instrument 55 there is obtained an indication of the magnitude of the difference and also an indication as to whether this difference is above or below the standard.

While for the purposes of explanation certain circuit arrangements have been shown it, of course, is to be understood that I do not wish to be limited thereto since obviously variations in the circuit arrangements and in the instrumentalities employed may be made without departing from the spirit and scope of the appended claims.

I claim:

1. In a displacement measuring apparatus, the combination comprising a pair of variable impedances arranged to vary in opposite senses in accordance with the displacement to be indicated, a pair of fixed impedances, a source of alternating current, means connecting one of said variable impedances in series circuit with one of said fixed impedances, means connecting the other of said variable impedances in series circuit with the other of said fixed impedances, means for producing equal energization of each of said series circuits from said source of alternating current, a pair of bridge rectifiers, an indicating instrument differentially connected to the output of said rectifiers, means for energizing each rectifier from said source, and means for energizing each rectifier input in accordance with a different one of said first mentioned circuits.

2. In a displacement measuring apparatus, the combination comprising a pair of variable impedances arranged to vary in opposite senses in accordance with the displacement to be indicated, a pair of fixed impedances, a source of alternating current, means connecting one of said variable impedances in series circuit with one of said fixed impedances, means connecting the other of said variable impedances in series circuit with the other of said fixed impedances, means for energizing each of said circuits from said source of alternating current, means for balancing the impedances of said circuits, a pair of bridge rectifiers, means for introducing into said rectifiers equal circulating currents, a zero center direct current indicating instrument differentially connected to the outputs of said rectifiers, and transformer means for energizing each rectifier input in accordance with a different one of said first mentioned series circuits.

3. In a displacement measuring apparatus, the combination comprising a pair of variable impedances arranged to vary in opposite senses in accordance with the displacement to be indicated, a pair of fixed impedances, a source of alternating current, means connecting one of said variable impedances in series circuit with one of said fixed impedances, means connecting the other of said variable impedances in series circuit with the other of said fixed impedances, means for producing equal energization of each of said circuits from said source of alternating current, a pair of bridge rectifiers, means for supplying continuously alternating current to said rectifiers, an indicating instrument differentially connected to the outputs of said rectifiers, and means for controlling the current outputs of said rectifiers in accordance with different ones of said first mentioned series circuits.

4. In a displacement measuring apparatus, the combination comprising a pair of variable impedances arranged to vary in opposite senses in accordance with the displacement to be indicated, a pair of fixed impedances, a source of alternating current, means connecting one of said variable impedances in circuit with one of said fixed impedances, means connecting the other of said variable impedances in circuit with the other of said fixed impedances, means for producing equal energization of said circuits from said source of alternating current, a pair of bridge rectifiers, an indicating instrument differentially connected to the outputs of said rectifiers, means for energizing said rectifiers from said source of alternating current to produce equal currents through said rectifiers, and means for simultaneously energizing each bridge rectifier in accordance with the current condition in a different one of said first mentioned circuits.

5. An apparatus comprising a pair of electromagnetic coils subject to opposite changes in impedance, a pair of fixed impedance coils, a plurality of circuits each including one of said coils and one of said impedances, a source of alternating current, means for producing balanced energization of said circuits from said alternating current source, a pair of bridge rectifiers each arranged to be energized across one diagonal in accordance with the condition of one of said circuits and also with potential from said alternating current source, and a zero center indicating instrument differentially connected with the other diagonals of said bridge rectifiers.

6. In a displacement measuring apparatus, the combination comprising a pair of variable impedances arranged to vary in opposite senses in accordance with the displacement to be indicated, a pair of fixed impedances, means connecting one of said variable impedances in circuit with one of said fixed impedances, means connecting the other of said variable impedances in circuit with the other of said fixed impedances, a pair of bridge rectifiers, an indicating instrument differentially connected to the outputs of said rectifiers, a transformer arranged to be connected to a source of alternating current, said transformer having a plurality of secondary windings, means for producing equal energization of said circuits from one of said windings, and transformer means energized in accordance with the voltages appearing across said fixed impedances, said transformer including a plurality of secondary windings each connected in series with one of said bridge rectifiers and one secondary winding of said first mentioned transformer.

CLAUDE M. HATHAWAY.

REFERENCES CITED

The following references are of record in the file of this patent:

UNITED STATES PATENTS

| Number | Name | Date |
| --- | --- | --- |
| 2,338,732 | Nosker | Jan. 11, 1944 |
| 2,240,184 | Hathaway | Apr. 29, 1941 |
| 2,268,956 | Mestas | Jan. 6, 1942 |

FOREIGN PATENTS

| Number | Country | Date |
| --- | --- | --- |
| 556,607 | Great Britain | Oct. 13, 1943 |